March 2, 1926.
A. H. KENNEDY
1,575,583
DUPLEX PUMP GEAR
Filed July 14, 1924
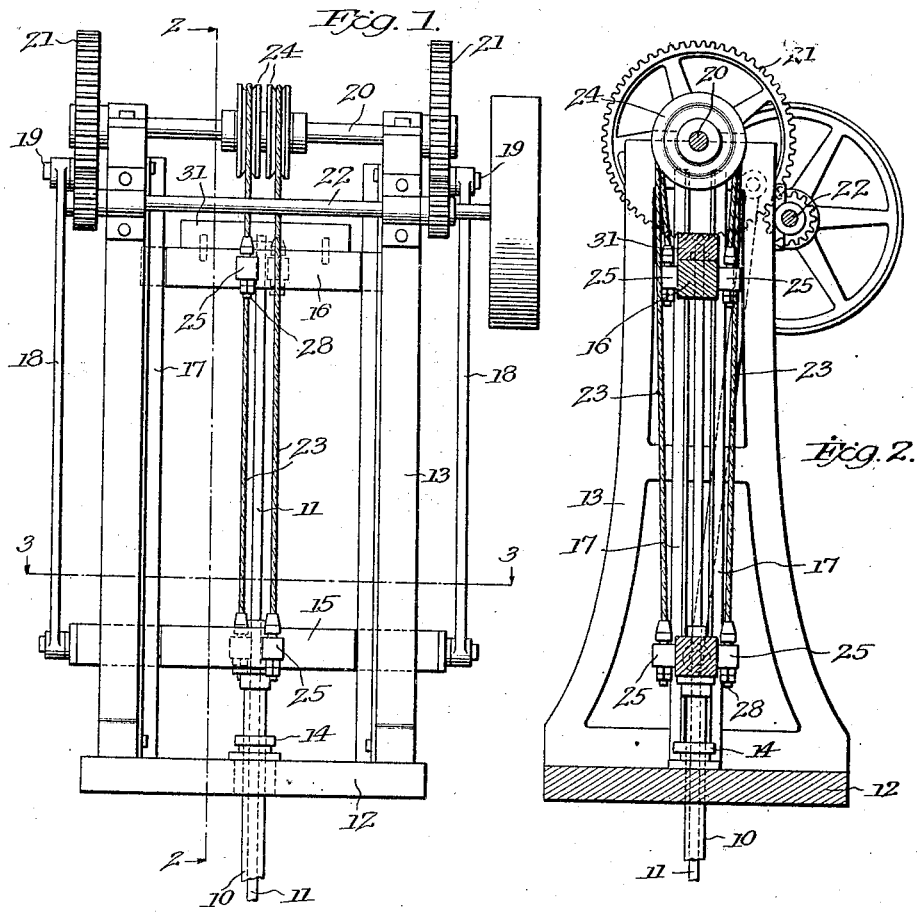
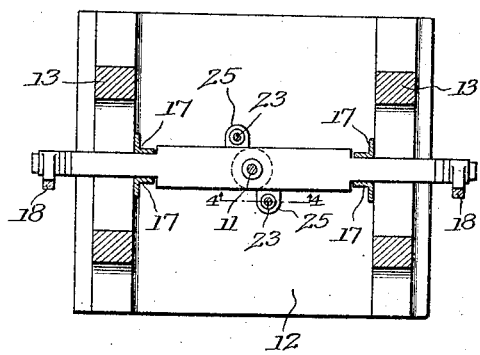
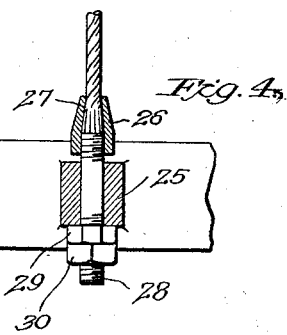
Inventor
Albert H. Kennedy
By Emery, Booth, Janney & Varney
his Attorneys

Patented Mar. 2, 1926.

1,575,583

UNITED STATES PATENT OFFICE.

ALBERT H. KENNEDY, OF ROCKPORT, INDIANA.

DUPLEX PUMP GEAR.

Application filed July 14, 1924. Serial No. 726,014.

*To all whom it may concern:*

Be it known that I, ALBERT H. KENNEDY, a resident of Rockport, in the county of Spencer and State of Indiana, have invented an Improvement in Duplex Pump Gears, of which the following description, in connection with the accompanying drawings, is a specification, like characters on the drawings representing like parts.

My invention aims to provide an improved gearing for actuating duplex pumps for wells and the like.

In the accompanying drawing wherein I have shown one embodiment of my invention for illustrative purposes:

Fig. 1 is a side elevation of my improved gearing applied to a duplex well pump;

Fig. 2 is a vertical section taken on the line 2—2 of Fig. 1;

Fig. 3 is a transverse section taken on the line 3—3 of Fig. 1; and

Fig. 4 is a section taken on the line 4—4 of Fig. 3.

Referring to the embodiment of my invention selected for illustrative purposes, I have shown my improved gearing applied to a duplex or double acting pump having concentric sucker rods 10 and 11, one mounted to reciprocate within the other. The upper ends of the sucker rods project through the base 12 of a vertical frame 13, the outer one being arranged to reciprocate in a suitable guide such as the collar 14.

The inner sucker rod 11 is shown as extending through the upper end of the outer one (see Fig. 1) and cross-heads 15 and 16 are mounted on their upper ends. Each of the cross-heads is slidably mounted in guideways 17 conveniently made of structural angles secured to the frame and spaced apart as shown in Fig. 3. As shown, the ends of the cross-heads are preferably shouldered adjacent to the guides to prevent lateral play.

One of the cross-heads, preferably the lower one, 15 (see Fig. 1) is positively actuated by pitman rods 18 driven by cranks 19 on a drive shaft 20 journalled in the top of the frame. I have shown the gears 21 on the ends of the drive shaft 20 and a power driven countershaft 22 having small gears meshing therewith for driving them.

The lower cross-head is utilized to drive the upper one by a pair of flexible cables 23 each adjustably connected to the respective cross-heads on diametrically opposite sides of the sucker rods and trained over pulleys or anti-friction rollers 24 loosely mounted on the shaft 20, so that the cross-heads move in opposite directions and counterbalance each other. These rollers are preferably confined between collars fixed on the shaft.

On each of the cross-heads (see Figs. 3 and 4) I have shown integral perforated ears 25 to which the cables are adjustably connected by means of sockets 26, each having a tapered recess 27 at its upper end into which the ends of the cables are jammed and secured by threaded rods 28 entered in the bottom of the sockets and projecting through the ears 25 on the lower ends of the threaded rods below the ears 25 I have shown nuts 29 providing adjustable stop shoulders to bear against the ears and maintain the cables under equal tension. These nuts may be locked against turning by jam nuts 30 or other suitable means, and can easily be adjusted to take up the slack in either cable resulting from stretching or other causes.

On the upper cross-head (see Fig. 1) I have shown a weight 31 to compensate for the difference between the weights of the sucker rods together with their operating parts, so that the pumps balance each other. Of course, this weight may be varied if desired or exchanged for another as, for example, when a valve is replaced on one of the sucker rods causing more friction and decreasing its effective weight.

From the foregoing description it is clear that I have produced a duplex pump gear comprising relatively few parts to get out of order and which requires a minimum amount of power to operate since the weight of one sucker rod is utilized to assist in operating the other. Also, the stresses on the operating parts are practically uniform so that uneven wear is eliminated. The cables are easy to install and to keep adjusted, and are far less expensive than gears which not only are subject to wear causing back lash but also are noisy and otherwise objectionable.

Obviously, my invention is not limited to the particular embodiment herein shown and described.

What I claim and desire to secure by Letters Patent is:

1. A pump gear for duplex pumps having concentric sucker rods, comprising a frame, a pair of cross-heads connected to the sucker rods and mounted to reciprocate in the frame, cross-head guides secured to the frame, one of said cross-heads having opposite ends projecting through said guides, gearing including a pair of pitman rods connected to said ends and a cable having its ends secured to both of said cross-heads and trained over a pulley for actuating the other cross-head.

2. A pump gear for duplex pumps having concentric sucker rods comprising a frame, a pair of superimposed cross-heads for the sucker rods reciprocable in the frame, gearing mounted on the frame above said cross-heads including a shaft having gears at its opposite ends and pitman rods for actuating one of said cross-heads, a pair of cables having their ends connected to the cross-heads and trained over pulleys freely rotatable on said shaft for actuating the other cross-head.

3. A pump gear for duplex pumps having concentric sucker rods comprising a frame, a pair of cross-heads on the sucker rods mounted in the frame, means for reciprocating said cross-heads simultaneously in opposite directions and means to balance the reciprocating parts.

4. A pump gear for duplex pumps having concentric sucker rods comprising a frame, a pair of cross-heads on the sucker rods mounted in the frame, means for reciprocating said cross-heads simultaneously in opposite directions and a removable weight on one of said cross-heads to balance the reciprocating parts.

5. A pump gear for duplex pumps having reciprocating sucker rods comprising power means positively actuating one of said sucker rods, cables connected to said sucker rods and trained over a pulley for actuating the other sucker rod and cable clamps adjustably connected to said sucker rods whereby to vary the lengths of said cables.

6. A pump gear for duplex pumps having a pair of reciprocating sucker rods and cross-heads mounted thereon comprising power means connected to one of said cross-heads for actuating one of said sucker rods, and a pair of cables connected to said cross-heads for actuating the other cross-head, the connection between said cables and cross-heads including cable clamps having threaded rods adjustably secured to the respective cross-heads.

7. A pump gear comprising the sucker rods 10 and 11, the cross-heads 15 and 16 on the sucker rods, and reciprocable in the frame 13, the pitman rods 18 operating the cross-head 15 and the flexible cables 23 trained over the pulleys 24 for actuating the cross-head 16, all substantially as shown and described.

In testimony whereof, I have signed my name to this specification.

ALBERT H. KENNEDY.